United States Patent
Chang et al.

(10) Patent No.: US 8,255,512 B2
(45) Date of Patent: Aug. 28, 2012

(54) SYSTEM AND METHOD FOR TRACKING USER INTERACTIONS AND NAVIGATION DURING RICH MEDIA PRESENTATIONS

(75) Inventors: Sih-Pin Subrina Chang, Old Tappan, NJ (US); Shu-Chen Jeane S. Chen, Chappaqua, NY (US); Keeranoor G. Kumar, Randolph, NJ (US); James S. Lipscomb, Yorktown Heights, NY (US); Jai Menon, Croton-on-Hudson, NY (US); Sreedhar Rochan, Mt. Kisco, NY (US); Arun Ramchandra, Danbury, CT (US); Liang-Jie Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 2362 days.

(21) Appl. No.: 10/392,055

(22) Filed: Mar. 19, 2003

(65) Prior Publication Data

US 2004/0006592 A1     Jan. 8, 2004

Related U.S. Application Data

(63) Continuation of application No. 09/432,418, filed on Nov. 2, 1999, now abandoned.

(60) Provisional application No. 60/136,391, filed on May 27, 1999.

(51) Int. Cl.
*G06F 15/173* (2006.01)
(52) U.S. Cl. .................. 709/224; 709/223
(58) Field of Classification Search ............ 709/217, 709/219, 229, 223, 224
See application file for complete search history.

(56) References Cited

U.S. PATENT DOCUMENTS

| | | | | |
|---|---|---|---|---|
| 5,796,952 A | * | 8/1998 | Davis et al. | 709/224 |
| 5,968,125 A | * | 10/1999 | Garrick et al. | 709/224 |
| 6,052,676 A | * | 4/2000 | Hekmatpour | 706/11 |
| 6,134,532 A | * | 10/2000 | Lazarus et al. | 705/14 |

* cited by examiner

Primary Examiner — Peling Shaw

(57) ABSTRACT

A multi-media information system enables tracking of user interactions to media presentations. A content creation phase enables a creator to specify presentation events or user interactions that can be tracked. A token(s) is introduced into the content by the creator to represent each piece of information to be tracked. A deployment delivery phase delivers the presentation to a web page for a user experience phase and interaction. Trackable information is communicated by the user to the tracking server at different instances of time. Each pre-authored trackable information can be flagged to be "real-time" or otherwise at the granularity of the token or at the granularity of each trackable context. When trackable information is not "real-time", the information is put into one of several information clusters of different priority. When each cluster achieves a critical mass, the cluster moves to a ready state for transmission to the tracking server.

18 Claims, 5 Drawing Sheets

PHASES OF TRACKING MODEL 60

PHASES OF TRACKING MODEL
60

CONTENT CREATION WORK FLOW

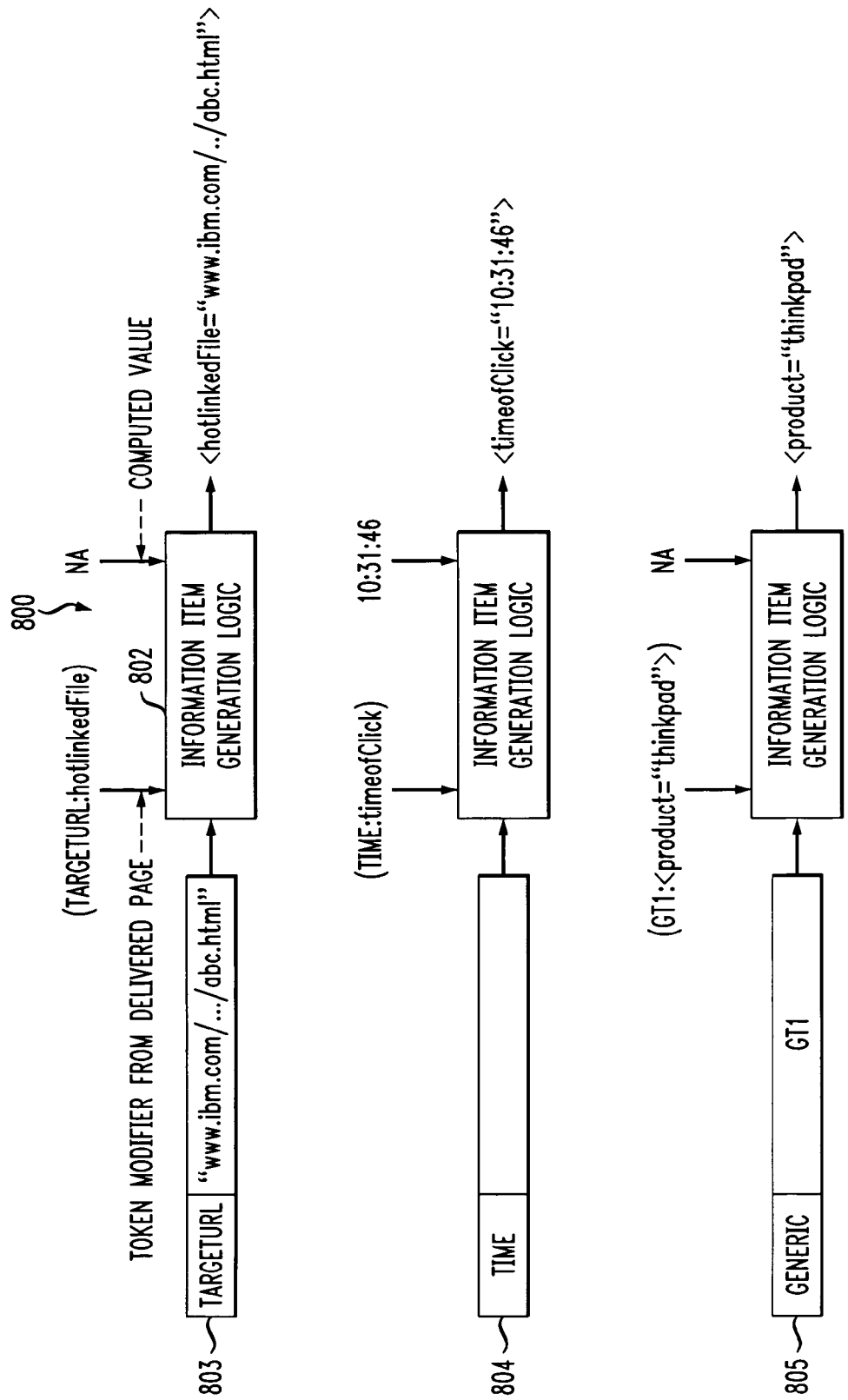

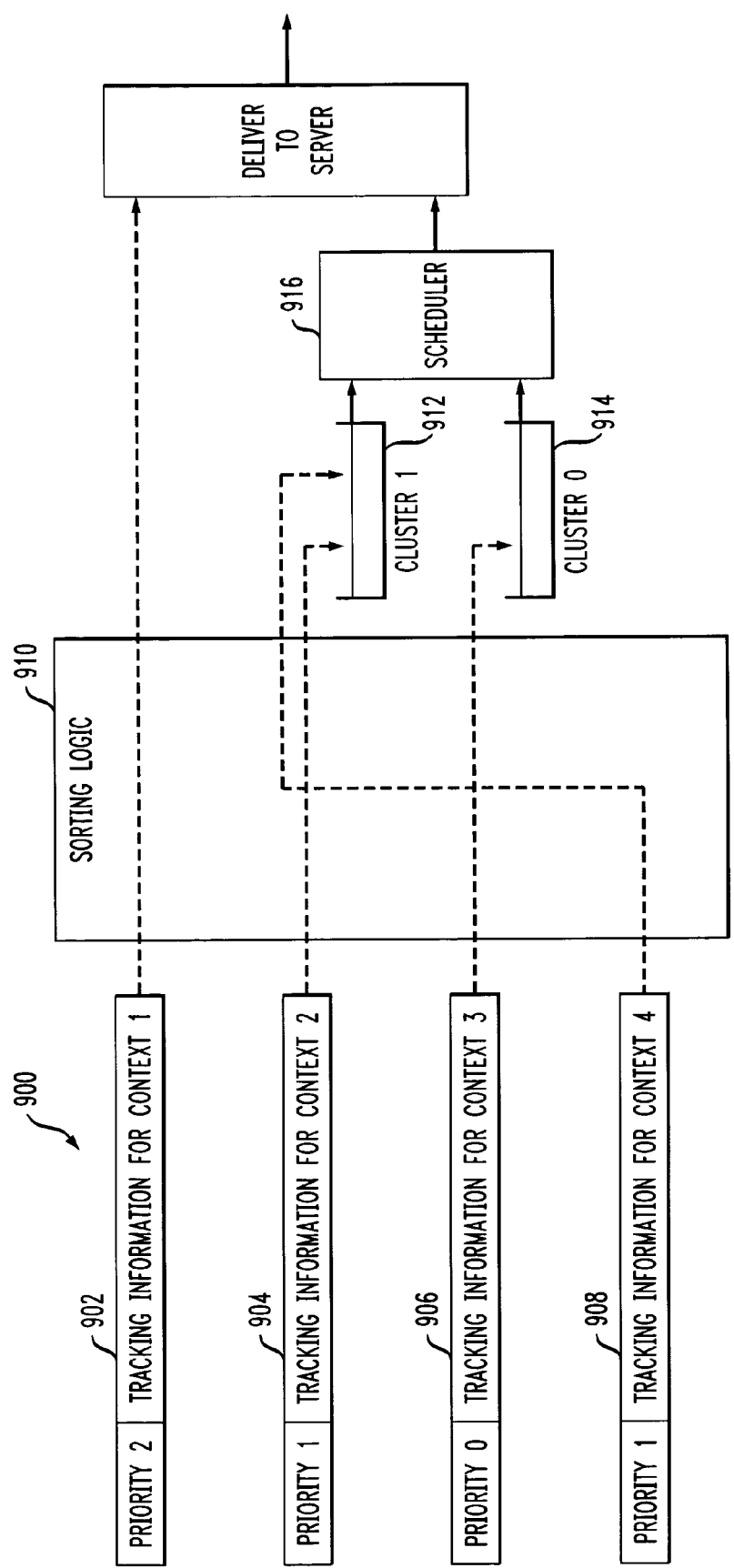

SYSTEM AND METHOD FOR TRACKING USER INTERACTIONS AND NAVIGATION DURING RICH MEDIA PRESENTATIONS

RELATED APPLICATIONS

The present application is a continuation application of the U.S. application identified as Ser. No. 09/432,418 filed on Nov. 2, 1999 now abandoned, which claims priority to the U.S. provisional application identified as Ser. No. 60/136,391 filed May 27, 1999, the disclosures of which are incorporated by reference herein.

The following copending applications are related to the present invention and are assigned to the same assignee as that of the present invention and are fully incorporated herein by reference:
1) Ser. No. 09/268,539, filed Mar. 12, 1999, entitled "Framework For Progressive Hierarchical And Adaptive Delivery Rich Media Presentations And Associated Meta Data"
2) Ser. No. 09/100,418, filed Jun. 20, 1998, entitled "Progressive Interleaved Delivery Of Interactive Descriptions & Renderers For Electronic Publishing Of Merchandise".
3) Ser. No. 09/169,836, filed Oct. 9, 1998, entitled "Personalizing Rich Media Presentation Based On User Response To the Presentation".

BACKGROUND OF INVENTION (1) Field of Invention

This invention relates to multi-media information systems. More particularly, the invention relates to multi-media information systems which enable tracking of information about a user's intentions, preferences and attitudes in a rich media presentation.

(2) Background Discussion

With the advent of push technology, i.e. where you allow a provider to send you content without your having specifically identified the content, tracking of user interactions with the delivered contents for statistical and inference deriving purposes is widely practiced. Many server technologies for gathering and managing knowledge exist today. When the delivered content takes the shape of rich media, i.e. content containing still images, animated images, video images, audio, etc., the user interaction space however becomes much larger and more complex since a whole variety of concepts and ideas can be expressed through interactive rich media. Consequently, the user intentions, preferences and attitudes that can be tracked in rich media interaction forms a much larger set. What is needed in the art is a tracking system with the following characteristics:

a) a tracking framework that considerably expands the scope of information that can be tracked.

b) tracking of both information which is statically inserted into content as well as information that is dynamically computed at the client.

c) individual specification and customizability of information to be tracked at the time of content creation for every tracking context.

d) choice of a subset of information to be tracked out of the set specified at the time of content creation, as per the goals of a campaign or preferences of a tracking server.

e) seamless interfacing with multiple tracking servers requiring neither changes to server code or changes to content.

f) specification of communication priority of each tracked information segment and clustering in time (wherever possible) of information transmitted back to a tracking server so as to optimize the number of server connections for tracking.

g) specification of tracking disablement for the content.

SUMMARY OF INVENTION

An object of the invention is a system and a method in a multi-media information system for tracking of information about a user's intentions, preferences and attitudes captured as a result of the user's interactions with a rich media presentation of a product, idea or service where the range of information to be tracked is pre-specified as meta information in an authored content and is modified at the time of deployment or delivery of the content.

Another object is a system and a method in an multi-media information system wherein the user's interaction can produce intra-media transitions, inter-media transitions, media player state changes, non-media consequences or a combination thereof, each providing a potential context for tracking.

Another object is a system and a method in a multi-media information system wherein every context for tracking can generate tracking information that may comprise of a combination of information units.

Another object is a system and a method in a multi-media information system wherein the content creation phase enables the specification of the contexts for tracking.

Another object is a system and a method in a multi-media information system wherein the content creation phase enables the specification of the information units for tracking against each specified context.

These and other objects, features and advantages are achieved in a multi-media information system including a content creation station coupled to a tracking server through a distributed information network and a client station responsive to inputs for tracking user intentions, preferences and attitudes with respect to rich media generated at the content creation station within a tracking framework including a content creation phase; a deployment/delivery phase, and a user experience phase. The content creation phase enables a creator to specify presentation events or user interactions that can be tracked during a presentation of the rich media content. A token(s) is introduced into the content to represent every piece of information to be tracked. The deployment or content delivery phase determines which among all the tracking specification pre-authored into the content is of interest for deployment or delivery. The actual information transmitted back to a server can involve a selection of tokens for which tracking is to be carried out at the deployment or content delivery phase. Trackable information is communicated by clients to the tracking server at different instances of time. Each pre-authored trackable information can be flagged to be "real-time" or otherwise at the granularity of the token or at the granularity of each trackable context. When trackable information is not "real-time" critical, the information is put into one of potentially several information clusters of different priority. When each cluster achieves a critical mass, the cluster moves to a ready state for transmission to the tracking server.

DESCRIPTION OF DRAWING

The invention will be further understood from the following description of a preferred embodiment taken in conjunction with an appended drawing, in which:

FIG. 4 is a representation of tracking information generation logic incorporated in FIG. 3.

FIG. 5 is a representation of tracking information delivery logic incorporated into the user experience phase of FIG. 2.

DESCRIPTION OF A PREFERRED EMBODIMENT

In the present invention, a generalized tracking framework is disclosed that is based on the idea of a tokenized expression by a content creator as to what information flows back to a tracking server in each trackable context. There are tokens that carry values which are fixed (such as the color of the object clicked on) and whose values are computed (such as the token representing the time of click). Since knowledge management servers are each different in terms of an interface they implement with a client; the tracking framework of the present invention provides a mapping feature between the tokens in the created content and the keywords of the server interface. The tracking framework enables easy re-purposing of content to be tracked by other servers. The invention also makes it possible to prioritize, schedule and cluster tracking of information sent to the tracking server in time so that the number of distinct connections made to the server to communicate tracking information is optimized. Tracking can be disabled on a created content, if so desired by setting some flags in the content. The client tracking capability implemented in this invention meets these design goals in terms of "modifiability" and "time clustering" of tracking information.

Figure 1:
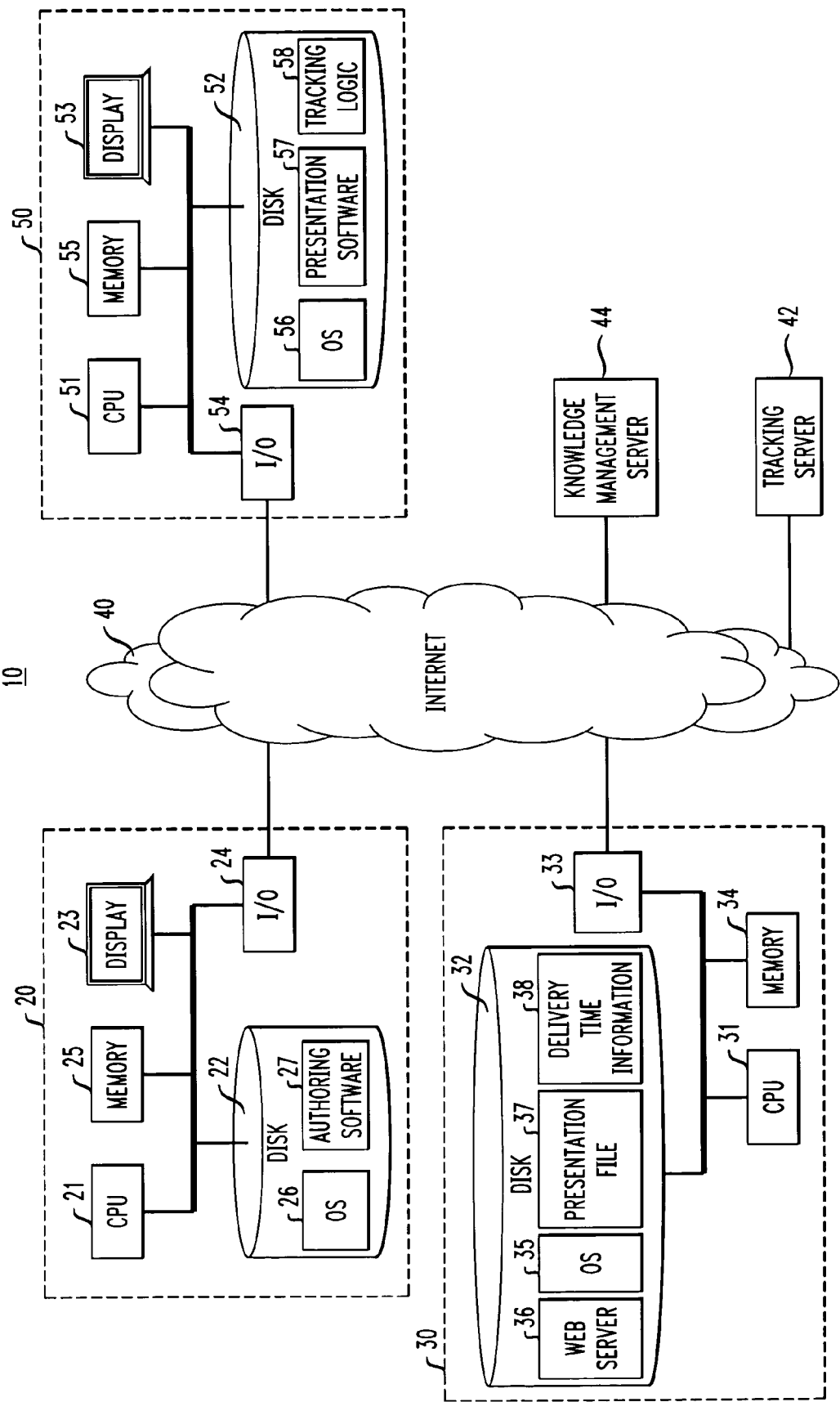
FIG. 1 is a representation of a tracking system incorporating the principles of the present invention.

Now turning to FIG. 1, a tracking system 10 includes a content creation station 20 which is either the same as or is coupled to a content delivery station 30 through a network 40, typically a distributed information network, e.g. the Internet. The network 40 includes a tracking server 42 and knowledge management servers 44 accessible by the content creation station 20 as well as content delivery station 30 to create and deliver content to be tracked for user intentions, preferences and attitudes. A client station 50 enables a user to respond to the rich media in the process of its presentation and provide input to the tracking server for the benefit of the content creation and delivery stations.

The content creation station 20 serves as an authoring tool and includes a standard CPU 21 coupled to a hard disk 22, a display 23, an input/output terminal 24 and a standard random access memory 25. Contained in the disk 22 is software for station operation 26, and for authoring or creating rich media as well as generating tokens for tracking information logic 27.

The content delivery station 30 similarly includes a standard CPU 31 coupled to a hard disk 32, an input/output terminal 33 and a standard random access memory 34. Contained in the disk 32 are software for station operation 35, and a web server software 36 for delivering over the internet 40 the rich media presentation file 37 created by the authoring tool, and the delivery time information file 38.

The client station 50 includes a standard CPU 51 coupled to a hard disk 52, a display 53, an input/output terminal 54, and a standard random access memory 55. Contained in the disk 52 are software for station operation 56, software for content presentation 57, and software representing the tracking logic 58 that captures user interaction, generates information and prioritizes their delivery to the tracking server 42.

Figure 2:
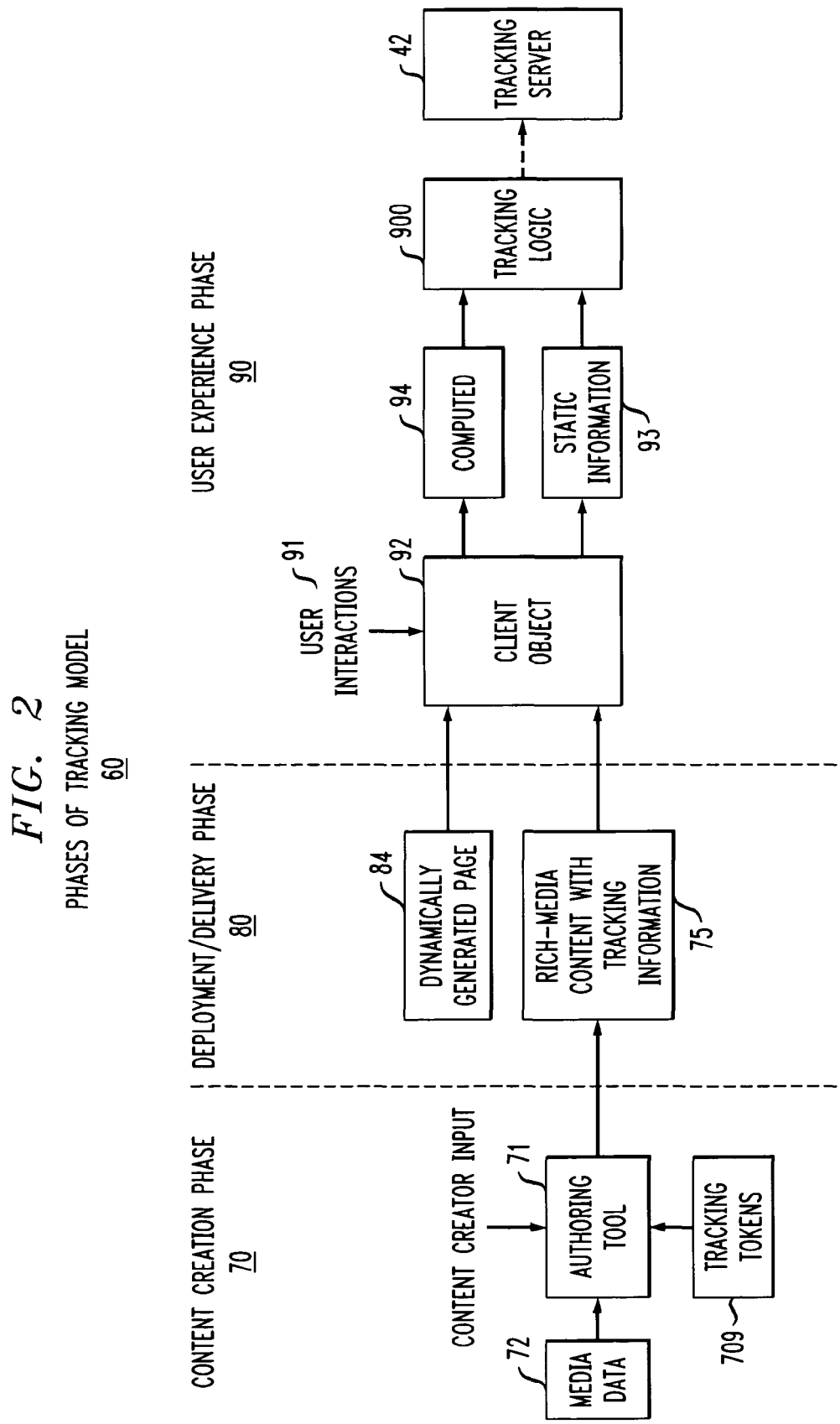
FIG. 2 is a representation of a tracking framework including a content creation phase; a deployment/delivery phase and a user experience phase employed in the system of FIG. 1.

The operation of the system 10, shown in FIG. 1, will now be described in conjunction with a tracking framework 60 shown in FIG. 2 and consisting of a content creation phase 70, a deployment/delivery phase 80 and a user experience phase 90. The content creation phase 70 enables a creator using an authoring tool 71 responsive to media data 72 to create a rich media presentation 75 for presentation file 37 and incorporating tracking tokens 709 (to be described in FIG. 3) as specifications of trackable events and interactions. After creation, a presentation 75 is hosted until the deployment/delivery phase 80 during which time the presentation 75 will be delivered as part of a dynamically generated page 84 to the client station 50. The flow of tracking information to the tracking server happens during the user experience phase 90 in which user interactions 91 with the presentation 75 in a terminal 92 generates static tracking information 93 and computed tracking information 94 using tracking logic 800 (to be described hereinafter in conjunction with FIG. 4) for delivery to the tracking server 42.

Figure 3:
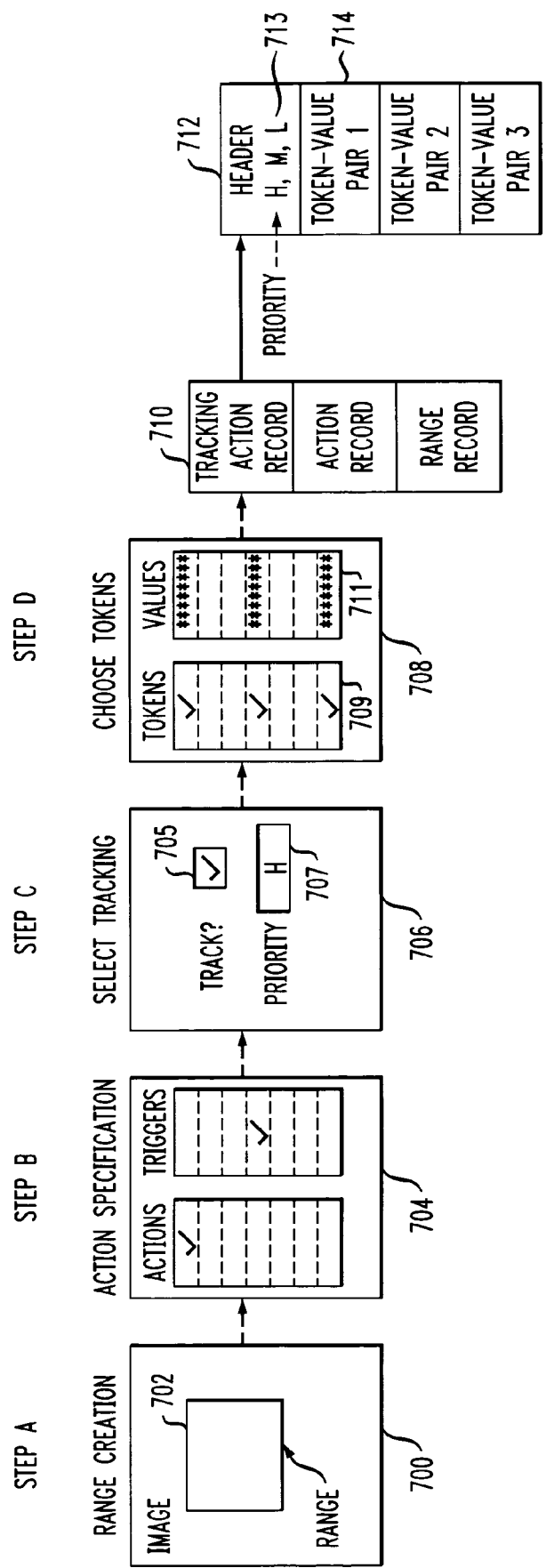
FIG. 3 is a representation of the content creation phase workflow in FIG. 2.

In FIG. 3, content creation work flow begins where the author inserts information in the content in specific places that is returned to the tracking server 42 in the same or slightly modified form for subsequent influence on the content creation process. In step A, the author selects first an image 700 and then a range 702 from that image. The range represents a spatio-temporal sub-extend of the content presented to the user at the client station 40. If the content presented to the user were a rectangular image for example, an associated range would be a sub-rectangular segment within it. Step A in FIG. 3 illustrates an instance of range specification by the content creator. Here the creator first opens an image 700 in the content creation tool and then drags the mouse over it to select a rectangular sub-region 702 within it. There are similar range specification operations defined for other media types such as video, panoramas and so forth. The purpose of a range is to serve as a context to perform hyperlinked actions. When the client station displays to an end-user an image authored by the creator for example, if a range within that image was specified as well, then moving the cursor using the mouse to a point within the range rectangle can be made to produce a sound. This sound is an example of a hyperlinked action and it can be made to happen by specifying it at the content creation time. Step B in FIG. 3 illustrates how, following the specification of a range, a hyperlinked action can be associated with it. Double clicking on the range 702 in step A will for example present to the content creator the dialog of step B 704 which enables him/her to select a hyperlinked action and a trigger for it. In the example described above the hyperlinked action is "sound" and the trigger is "cursor entering the range". It may be observed from this example that the action trigger is thus associated with the range or alternatively the range provides a context for the action trigger. It is not hard to see the generalization from this example where the triggers can belong to a very large set of possibilities and the hyperlinked actions likewise.

The content creator's act of selecting an action and an associated trigger in step B will also automatically bring up step C and a dialog box 706 which gives him/her the opportunity to specify whether the event corresponding to the triggering of the action in question should be tracked. When an action event is marked as one that should be tracked in box 707, the triggering of the action on the client would also alongside cause some information to be communicated from the client back to the tracking server. Exactly what should be communicated back can be authored by the content creator. In the dialog of step C, if the creator selects tracking in the dialog box 706 by clicking on a tracking box 705, then it will bring up automatically the dialog box 708 of step D which will provide the opportunity to author the information that the client should send back to the server which will henceforth be referred to as the tracking communication. Also specifiable is a priority in box 707 with which the tracking communication should be sent to the server by the client. A high priority (H) will cause the tracking communication to be transmitted instantly. A medium priority (M) on the other hand will cause it to be transmitted at the earliest opportunity, and so on.

The dialog box 708 in step D offers to the content creator the opportunity to define the tracking communication. The tracking communication can be made up of several units of information. Each unit corresponds to a token in a token box 709 that the content creator chooses to include in the content in step D as illustrated. Whenever a token is checked in the box 709, the content creator also gets an opportunity to include a default value in a default box 710 for the checked token.

There are collections of predefined token types in the framework to choose from or new ones can also be introduced by the content creator. Two examples of predefined token types are "TARGETURL" and "TIME". TARGETURL is a token that specifies the name of a target file on the internet (expressed as a URL) which is to be sent as part of the tracking communication whenever this token is processed by the tracking logic on the client. TIME on the other hand is a token that specifies that the current system time on the client station should be sent as part of the tracking communication whenever this token is processed by the tracking logic. New tokens created by the content creator belong to a special type called "GENERIC". The different screens and contexts of the content creation process will provide the creator the opportunity to express his/her selection for tracking related choices which will result in the automatic insertion of tokens into the resulting content file.

As explained previously step D enables the creator to introduce different token combinations at different contexts in the presentation and thereby provides the potential of a very large set of information that can be transmitted back to the server. Corresponding to every context, this information gets entered as a tracking action record in a record table 710; which will reside in memory 25 (See FIG. 1) during the active lifetime of the content creation phase 70 (See FIG. 2) and will be subsequently recorded by the content creation phase 70 into a rich media presentation file 37 (See FIG. 1). The information will have a record structure 712 consisting of a header 713 containing the tracking communication priority (H, M, L), and a sequence of token-value pairs 714, one corresponding to each token picked in step D.

The client station 50 (FIG. 1) enables a user to respond to the rich media in the process of the presentation 75 and provide input to the tracking server for the benefit of the content creation and delivery stations. The tracking communication transmitted back to the tracking server 42 from the client station 50 is made up of units, each of which is of the form "token=value". The value is either the pre-specified one in the content record structure 712 or is computed by the client in many instances in a context dependent way. For example, if the token is "TARGETURL", the value is the name of the target file and will be contained in the record structure 712, coupled to the token specification. If on the other hand the token is "TIME", the value is computed from system time by the client. Although a generic token comes specified in the file with a value, it is however just a placeholder. If for example we find an instance of the generic token specified with a value "GT1", the latter is just a placeholder for an actual string that will be determined at deployment time.

Although the rich media presentation file 75 resulting from the creation phase may carry the tokenized representation for various types of trackable information, these tokens may not be understood by the tracking server 42 which in all likelihood would be following its own different representation. For example, the token "TARGETURL" may correspond to the token "hotlinkedFile' for a certain server. However, during the deployment and delivery phase 80 (See FIG. 2), the content delivery station 30 includes information that is dynamically generated into a web page 84. This information is used by the generation logic 802 in FIG. 4 to generate the mapping for the tokens 803, 804, and 805 introduced by the creator so that they may be recognized by the server 42 (See FIG. 1). The deployment and delivery phase 80 is either a single event as in the setup of a web site or is a dynamic event such as in the case of the delivery of the content through a portal web site. Applet parameters carried by the HTML page hosting the rich media content are the source of the dynamically generated information provided to the client station. For the example, the token "TARGETURL" 803 has the following parameter statement, which would achieve mapping:

<PARAM NAME="TARGETURL" value="hotlinkedFile">

Another aspect of the deployment or content delivery phase is the determination of which among all the tracking specifications pre-authored into the content, is actually of interest for the deployment or delivery (as the case may be) in question. Typically, the actual information transmitted back to the server can correspond to a subset of the tokens authored for the situation. Not all information may be desirable for the tracking server involved or for the campaign. The information item generation logic 802 enables the selection of the tokens for which the tracking is to be carried out at the deployment or content delivery phase. The client sends only information pertaining to tokens for which a mapping is specified through the applet parameter as described above. For example, if the content file contains "TARGETMVR", "TIME" and "SUBJECT" (token associated with symbolic description of the clicked subject), but the applet parameter maps only the "TARGETMVR" and "TIME" tokens, then the symbolic description information is not sent to the server.

In FIG. 3, the deployment or content delivery phase also provides meaning to the generic tokens pre-authored into the content. For example, if we find an instance of the generic token specified with a value "GT1" and an applet parameter maps "GT1" to an URL string "www.abcdefcom/cgi-bin/trackme.exe? iam=here&yr=there", then the latter string is what constitutes the tracking server communication string complete with the URL address. Unless overridden by a generic token case as described above, all tracking communication from a client station is directed to a tracking server URL as specified by a "TRACKURL" parameter value in the applet tag.

In FIG. 4, the user experience phase 90 (See FIG. 2) communicates tracking communication from the client station 50 to the tracking server 42 (See FIG. 1) at different instances of time depending on the nature and priority of each information being tracked. In the content, each pre-authored trackable information 902, 904, 906, 908 (See FIG. 5) can be flagged by a priority (set in the token at the content creation phase 70) and processed by sorting logic 910 to be "real-time" or otherwise at the granularity of a token or at the granularity of each trackable context. Information that are flagged "real-time" are deemed urgent and need to be communicated to the tracking server immediately. An example would be when the tracking server is set to obtain real-time statistics on user interest on a specific subject or when the tracking server is controlling real-time responses back to the client as in real-time personalization of experience. When trackable information is not real-time critical, it would be sorted into one of potentially several information clusters 912, 914 of different priority. When each cluster attains a critical mass, the cluster moves to a "ready" state for transmission and is processed by a scheduler 916 for delivery to the tracking server 42. Ready clusters are scheduled as per the cluster priority (which in turn is determined by the priority expressed in tokens). Not all points in time during the client presentation are considered for information transmission to the server. The points that are chosen are determined based on suitability of the underlying state of the presentation. An example would be the creation or destruction of several objects and the replacement of the presentation file. Finally, the tracking of all or part of the information can be masked by applet parameters, which are used to flag what gets communicated.

While the invention has been described in conjunction with a preferred embodiment, various changes can be made without departing from the spirit and scope of the invention as defined in the appended claims, in which:

We claim:

1. A method of creating trackable content for deployment in an information network accessible by a client, comprising the steps of:
   generating content for deployment in the information network; and
   providing one or more tokens in the content corresponding to one or more particular units of prioritizable information to be tracked in association with client interaction with a presentation of at least a portion of the content and to be reported to a tracking system, wherein the one or more tokens comprise a priority which specifies when the prioritizable information is to be transmitted to the tracking system.

2. The method of claim 1, wherein a unit of information corresponding to a token is one of fixed, specifiable in a deployment phase, and computable at a client device.

3. The method of claim 1, wherein at least a portion of the one or more tokens are mappable in a deployment phase such that the one or more mappable tokens are recognizable to a tracking system.

4. The method of claim 1, wherein at least a portion of the one or more tokens are selectable in a deployment phase such that only information corresponding to a selected token is sent to a tracking system.

5. The method of claim 1, wherein the client interaction is able to produce at least one of intra-media transitions, inter-media transitions, media player state changes, non-media consequences and a combination thereof, wherein each provides a potential context for tracking.

6. The method of claim 5, wherein a potential context for tracking can generate tracking information in different token combinations at different contexts.

7. The method of claim 1, wherein information corresponding to a token is modifiable in a deployment phase to facilitate interfacing with one or more tracking systems that expect a modified form.

8. The method of claim 1, wherein information corresponding to a token represents a place holder that is replaceable in a deployment phase by dynamically determined tracking data.

9. The method of claim 1, wherein a priority can be pre-specified for a tracking context represented by a token influencing the urgency with which tracking information associated with that context is communicated to a tracking system.

10. The method of claim 9, wherein for a context that has a priority label of real-time, the tracking information is communicated immediately to the tracking system.

11. The method of claim 9, wherein tracking information based on prioritized tokens is composable as soon as the tracking context arises in the presentation but is communicated to the tracking system based on an urgency schedule.

12. The method of claim 11, wherein tracking information based on prioritized tokens with similar schedules are accumulatable into clusters for transmission together according to the schedules.

13. The method of claim 12, wherein the transmission of a cluster is influenced by at least one of the cluster attaining a critical mass and the priority of units in the cluster.

14. The method of claim 9, wherein the pre-specified priority of tracking information is modifiable in a deployment phase.

15. The method of claim 9, wherein a particular priority is specifiable only in a deployment phase.

16. A method of deploying trackable content in an information network accessible by a client, comprising the steps of:
    obtaining content for deployment in the information network, wherein the content comprises one or more tokens corresponding to one or more particular units of prioritizable information to be tracked in association with client interaction with a presentation of at least a portion of the content and to be reported to a tracking system, wherein the one or more tokens comprise a priority which specifies when the prioritizable information is to be transmitted to the tracking system; and
    delivering at least a portion of the content to the client.

17. The method of claim 16, wherein at least a portion of the one or more tokens are mapped such that the one or more mapped tokens are recognizable to a tracking system.

18. The method of claim 16, wherein at least a portion of the one or more tokens are selected such that only information corresponding to a selected token is sent to a tracking system.

* * * * *